(12) United States Patent
Miyoshi

(10) Patent No.: US 11,099,728 B2
(45) Date of Patent: Aug. 24, 2021

(54) ELECTRONIC APPARATUS, CONTROL METHOD, AND NON-TRANSITORY COMPUTER READABLE MEDIUM FOR DISPLAYING A DISPLAY TARGET

(71) Applicant: CANON KABUSHIKI KAISHA, Tokyo (JP)

(72) Inventor: Nari Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 16/391,671

(22) Filed: Apr. 23, 2019

(65) Prior Publication Data

US 2019/0332235 A1 Oct. 31, 2019

(30) Foreign Application Priority Data

Apr. 26, 2018 (JP) .............................. JP2018-084876

(51) Int. Cl.
  *G06F 3/0485* (2013.01)
  *G06F 3/0484* (2013.01)
  *G06F 3/0488* (2013.01)

(52) U.S. Cl.
  CPC ........ *G06F 3/0485* (2013.01); *G06F 3/04845* (2013.01); *G06F 3/04883* (2013.01); *G06F 2203/04806* (2013.01); *G06F 2203/04808* (2013.01)

(58) Field of Classification Search
  CPC ............... G06F 3/0485; G06F 3/04845; G06F 3/04883; G06F 2203/04806; G06F 2203/04808
  See application file for complete search history.

(56) References Cited

U.S. PATENT DOCUMENTS

| 2012/0293556 | A1* | 11/2012 | Kim | ....................... | G06F 3/0485 345/660 |
| 2013/0167075 | A1* | 6/2013 | Chanda | ................. | G06F 3/0481 715/800 |
| 2013/0326398 | A1* | 12/2013 | Zuverink | .............. | G06F 3/0488 715/784 |
| 2015/0296317 | A1* | 10/2015 | Park | ........................ | H04N 5/91 348/222.1 |

(Continued)

FOREIGN PATENT DOCUMENTS

JP 2017-011427 A 1/2017

*Primary Examiner* — Beau D Spratt
(74) *Attorney, Agent, or Firm* — Cowan, Liebowitz & Latman, P.C.

(57) ABSTRACT

An electronic apparatus includes: a receiving unit configured to be receivable a user operation of designating a position on a display target displayed on a display and moving the designated position; and a control unit, wherein in a case where the display target is displayed at a second magnification that is higher than a first magnification at which an entire display target is displayed, the control unit performs, in response to a movement of the designated position within an edge region of a display range of the display target caused by the user operation, control to change a position of the display range in a direction corresponding to the designated position and to lower a display magnification of the display target to a magnification higher than the first magnification and lower than the second magnification.

18 Claims, 5 Drawing Sheets

(56) References Cited

U.S. PATENT DOCUMENTS

| | | | | |
|---|---|---|---|---|
| 2016/0295125 A1* | 10/2016 | Osawa | ............... | H04N 5/23296 |
| 2016/0349970 A1* | 12/2016 | Everitt | ...................... | G06T 3/40 |
| 2017/0272661 A1* | 9/2017 | Tsubusaki | .......... | H04N 5/23296 |
| 2017/0300215 A1* | 10/2017 | Nakahama | .......... | G06F 3/04845 |
| 2018/0027186 A1* | 1/2018 | Jung | ...................... | H04N 13/20 |
| | | | | 348/333.05 |
| 2018/0227704 A1* | 8/2018 | Itoh | ........................ | G08G 1/005 |
| 2018/0300865 A1* | 10/2018 | Weiss | ........................ | G06T 7/10 |

* cited by examiner

<SETTING (CHANGE) OF DESTINATION>

<ROUTE CONFIRMATION>

ELECTRONIC APPARATUS, CONTROL METHOD, AND NON-TRANSITORY COMPUTER READABLE MEDIUM FOR DISPLAYING A DISPLAY TARGET

BACKGROUND OF THE INVENTION

Field of the Invention

The present invention relates to an electronic apparatus, a control method for an electronic apparatus, and a non-transitory computer readable medium, and in particular to a control method of changing an enlargement ratio according to a user operation during enlarged display of a display target.

Description of the Related Art

It is a well-known technique to cancel an enlarged display when an operation is performed to move a designated position out of a display range of an image displayed with enlargement (display target), and to return the display magnification of the image to the original display magnification (enlargement ratio; magnification in enlargement) when the operation of moving the designated position ends (Japanese Patent Application Publication (JP-A) No. 2017-011427). JP-A No. 2017-011427 discloses a technique of canceling the enlarged display when attempting to move an AF frame out of the display range of an image displayed with enlargement, and returning the display magnification of the image to the original display magnification when the movement of the AF frame ends.

It is also a conventional technique to move (scroll) an image display range, without changing the image display magnification, when an operation is performed to move a designated position out of a display range of an image displayed with enlargement.

SUMMARY OF THE INVENTION

However, in the above-described conventional technique (JP-A No. 2017-011427) for canceling the enlarged display, since the change of the display range due to the cancellation of the enlarged display is large when the original display magnification is large, the user may lose sight of the desired portion to which the designated position is wished to be moved.

Also, with the method of scrolling without changing the display magnification, it is necessary to move the display range until the desired portion is displayed, and when the display magnification is large, it sometimes takes time to move the display range to the desired portion. Further, when it is desired to move the designated position or the display range in an oblique direction, it takes time and effort to correct the movement direction.

Therefore, the present invention provides a technique enabling a user to easily and promptly find the desired portion on a display target.

An electronic apparatus according to the present invention includes a memory and at least one processor and/or at least one circuit to perform the operations of the following units: a receiving unit configured to be receivable a user operation of designating a position on a display target displayed on a display and moving the designated position; and a control unit, wherein in a case where the display target is displayed at a second magnification that is higher than a first magnification at which an entire display target is displayed, the control unit performs, in response to a movement of the designated position within an edge region of a display range of the display target caused by the user operation, control to change a position of the display range in a direction corresponding to the designated position and to lower a display magnification of the display target to a magnification higher than the first magnification and lower than the second magnification.

The present invention enables a user to easily and promptly find the desired portion on a display target.

Further features of the present invention will become apparent from the following description of exemplary embodiments with reference to the attached drawings.

DESCRIPTION OF THE EMBODIMENTS

Figure 1:
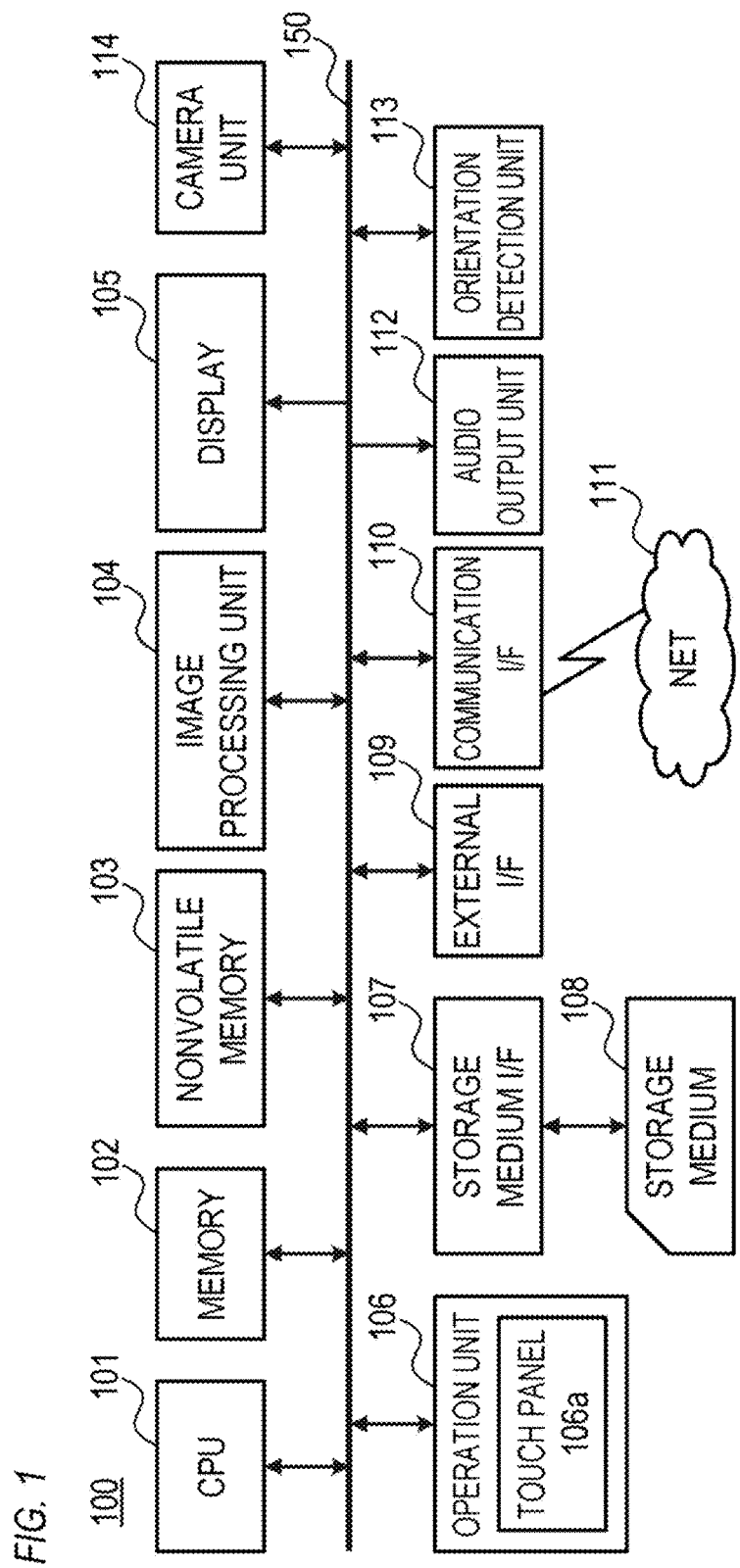
FIG. 1 is a block diagram of an electronic apparatus according to the present embodiment.

FIG. 1 shows an example of a configuration of an electronic apparatus 100 as an example of a display control device to which the present invention can be applied. The electronic apparatus 100 can be configured using a display device such as a smartphone.

In FIG. 1, a CPU 101, a memory 102, a nonvolatile memory 103, an image processing unit 104, a display 105, an operation unit 106, a storage medium I/F 107, an external I/F 109, and a communication I/F 110 are connected to an internal bus 150. An audio output unit 112, an orientation detection unit 113, and a camera unit 114 are also connected to the internal bus 150. The units connected to the internal bus 150 is capable of exchanging data with each other via the internal bus 150.

The CPU 101 is a control unit that controls the entire electronic apparatus 100, and is composed of at least one processor. The memory 102 is composed of, for example, a RAM (a volatile memory using a semiconductor element or the like). In accordance with a program stored, for example, in the nonvolatile memory 103, the CPU 101 controls each unit of the electronic apparatus 100 by using the memory 102 as a work memory. The nonvolatile memory 103 stores image data, audio data, other data, various programs for the CPU 101 to operate, and the like. The nonvolatile memory 103 is composed of, for example, a flash memory or a ROM.

Under the control of the CPU 101, the image processing unit 104 performs various image processing on images stored in the nonvolatile memory 103 and the storage medium 108, images acquired via the external I/F 109, and the like. Under the control of the CPU 101, the image processing unit 104 also performs various image processing on images acquired via the communication I/F 110, images acquired via the camera unit 114, and the like. The image may be a still image or a moving image. The image processing performed by the image processing unit 104 includes A/D conversion processing, D/A conversion processing, image data encoding processing, compression processing, decoding processing, enlargement/reduction processing (resizing), noise reduction processing, color conversion processing and the like. The image processing unit 104 may be constituted by a dedicated circuit block for performing specific image processing. Depending on the type of image processing, it is also possible for the CPU 101 to perform image processing according to a program without using the image processing unit 104.

Under the control of the CPU 101, the display 105 displays images, a GUI screen constituting a GUI (Graphical User Interface), and the like. The CPU 101 generates display control signals in accordance with a program, and controls each unit of the electronic apparatus 100 so as to generate a video signal to be displayed on the display 105 and output the video signal to the display 105. The display 105 displays a video image based on the outputted video signal. The configuration of the electronic apparatus 100 itself may be up to an interface for outputting a video signal to be displayed on the display 105, and the display 105 may be configured of an external monitor (a television or the like).

The operation unit 106 is an input device for receiving a user operation, examples thereof including a character information input device such as a keyboard, a pointing device such as a mouse or a touch panel, a button, a dial, a joystick, a touch sensor, a touch pad, and the like. The touch panel is an input device configured to be superimposed on the display 105 in a planar manner so that coordinate information corresponding to the touched position is outputted. The operation unit 106 (receiving unit) that can receive the user operation may be a receiving device for receiving a signal from an external input device such as a remote controller or the like, rather than an input device.

A storage medium 108 such as a memory card, a CD, and a DVD can be attached to the storage medium I/F 107 to read data from the attached storage medium 108 and to write data to the storage medium 108 under the control of the CPU 101. The external I/F 109 is an interface for connecting with an external device via a wire cable or wirelessly, and for inputting and outputting video signals and audio signals. The communication I/F 110 is an interface for communicating with an external device, the Internet 111, and the like to transmit and receive various data such as files and commands.

The audio output unit 112 outputs sounds of moving images and music data, operation sounds, incoming sounds, various notification sounds, and the like. Although the audio output unit 112 includes an audio output terminal 112a and a speaker 112b for connecting earphones and the like, it is also possible to output audio by wireless communication or the like.

The orientation detection unit 113 detects the orientation of the electronic apparatus 100 with respect to the direction of gravity. On the basis of the orientation detected by the orientation detection unit 113, it can be determined whether the electronic apparatus 100 is held horizontally, vertically, upward, downward, or obliquely. At least one of an acceleration sensor, a gyro sensor, a geomagnetic sensor, a direction sensor and the like can be used as the orientation detection unit 113, and a plurality of them can be used in combination.

The camera unit 114 includes an image capturing element (an image sensor) composed of a CCD, a CMOS element or the like for converting an optical image into an electric signal. In the image processing unit 104, predetermined calculation processing is performed using the captured image data, and the CPU 101 performs exposure control and distance measurement control based on the calculation result obtained. As a result, AF (auto focus) processing, AE (automatic exposure) processing, EF (flash pre-light emission) processing, and the like are performed.

The operation unit 106 includes a touch panel 106a. The CPU 101 can detect the following operation or state on the touch panel 106a.

The fact that a finger or a pen that has not been touching the touch panel 106a newly touched the touch panel 106a, that is, the start of the touch (hereinafter referred to as "touch-down").

A state in which a finger or a pen is touching the touch panel 106a (hereinafter referred to as "touch-on").

The fact that a finger or a pen is moving while touching the touch panel 106a (hereinafter referred to as "touch-move").

The fact that a finger or a pen that has been touching the touch panel 106a has separated from the touch panel 106a, that is, the end of the touch (hereinafter referred to as "touch-up").

A state in which nothing touches the touch panel 106a (hereinafter referred to as "touch-off").

When a touch-down is detected, a touch-on is detected at the same time. After the touch-down, the touch-on is normally continuously detected as long as a touch-up is not detected. Even when a touch-move is detected, the touch-on is detected at the same time. Even if the touch-on is detected, the touch-move is not detected, provided that the touch position has not moved. A touch-off is detected when the touch-up of all the fingers or pens that have been touching on the touch panel is detected.

These operations/states and coordinates of the position where the finger or the pen is touching on the touch panel 106a are notified to the CPU 101 through the internal bus, and the CPU 101 determines what kind of operation (touch operation) has been performed on the touch panel 106a on the basis of the notified information. Regarding the touch-move, the movement direction of a finger or pen moving on the touch panel 106a can also be determined for each vertical component and horizontal component on the touch panel 106a on the basis of a change in position coordinates. When it is detected that the touch-move has been performed over a predetermined distance or more, it is determined that a slide operation has been performed. An operation of moving a finger on the touch panel 106a quickly through a certain distance while the finger is touching on the touch panel 106a and then separating the finger is called a flick. In other words, the flick is an operation of tracing quickly on the touch panel 106a so as to flick the finger. When it is detected that a touch-move is made at a predetermined or higher speed through a predetermined or longer distance and a touch-up is then detected, it can be determined that a flick has been made (it can be determined that a flick has occurred following a slide operation). Further, a touch operation of touching a plurality of points (for example, two points) at the same time and bringing the touch positions close to each other is called pinch-in, and a touch operation of moving the touch positions away from each other is called pinch-out. Pinch-out and pinch-in are collectively referred to as a pinch operation (or simply a pinch). The touch panel 106a may be of any type selected from a resistance film type, a capacitance type, a surface acoustic wave type, an infrared type, an electromagnetic induction type, an image recognition type, an optical sensor type or the like. There are a method of detecting that there is a touch due to contact with the touch panel, and a method of detecting that there is a touch due to the approach of a finger or pen to the touch panel, and either of these methods may be used.

Figure 2:
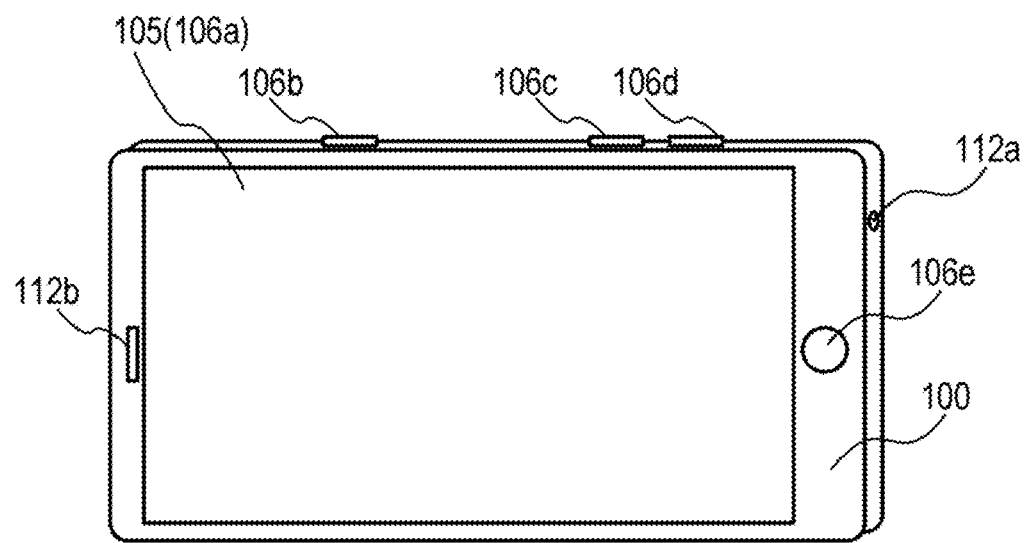
FIG. 2 is an external view of the electronic apparatus according to the present embodiment.

FIG. 2 shows an example of external appearance of the electronic apparatus 100. The display 105 displays images and various information. As described above, the display 105 is configured integrally with the touch panel 106a, and can detect a touch operation on the display surface of the display 105. As shown in the figure, the operation unit 106 includes operation units 106b, 106c, 106d, and 106e. The operation unit 106b is a power supply button for receiving an operation of switching on and off the power supply of the electronic apparatus 100. The operation unit 106c and the operation unit 106d are volume buttons for increasing and decreasing the volume of audio output from the audio output unit 112. The operation unit 106e is a home button for displaying the home screen on the display 105.

Figure 3:
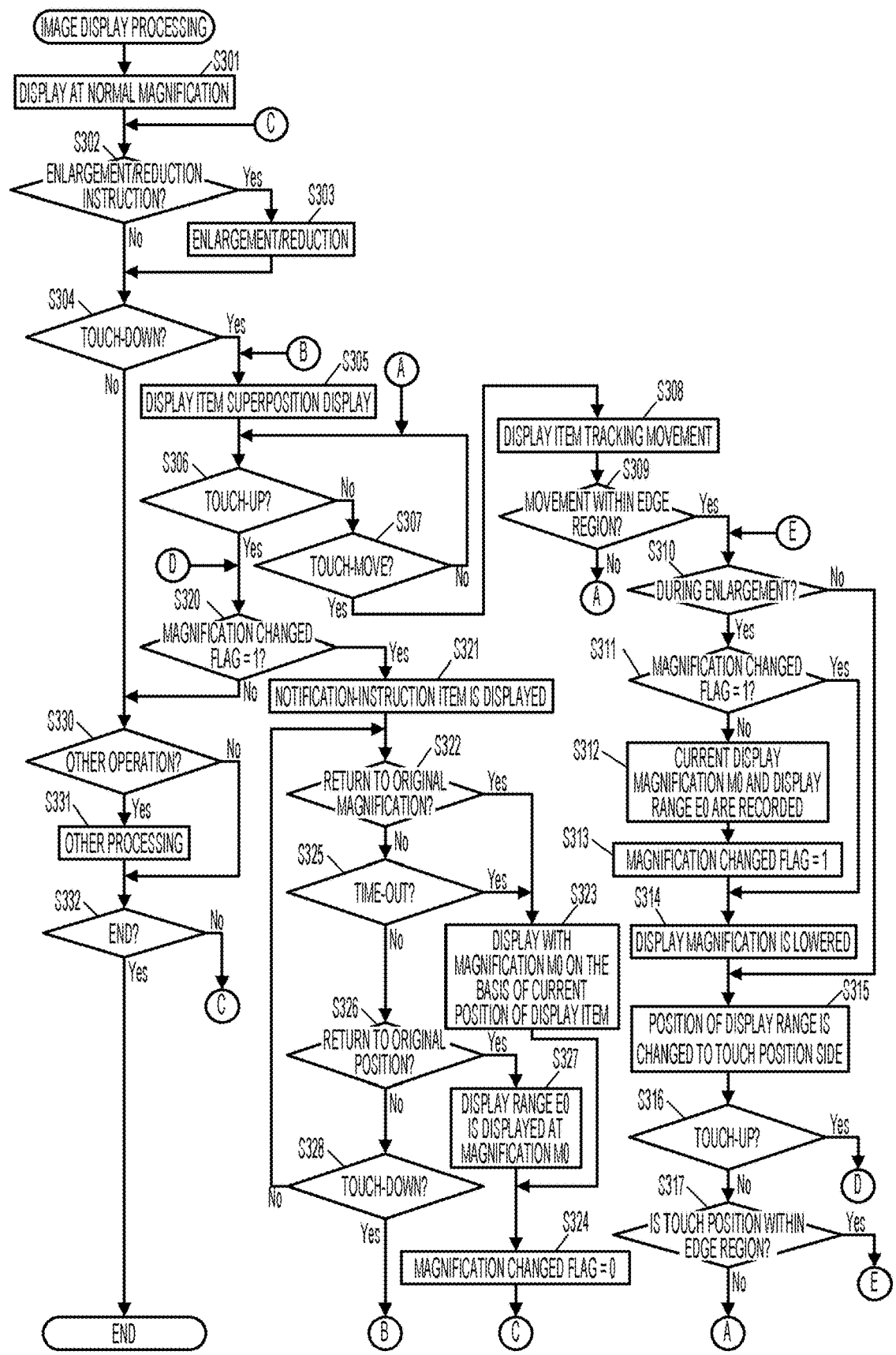
FIG. 3 is a flowchart of the electronic apparatus according to the present embodiment.

FIG. 3 shows a flowchart of image display processing in the present embodiment. In the present embodiment, this processing is display processing in which a live view image (LV image) captured by the camera unit 114 is displayed. This processing is realized by expanding the program recorded in the nonvolatile memory 103 in the memory 102 and executing the program by the CPU 101.

In S301, the CPU 101 displays the LV image captured by the camera unit 114 on the display 105 at normal magnification. The normal magnification is the display magnification at which the entire LV image is fitted in the display region for displaying the LV image on the display 105. More specifically, the normal magnification is the smaller one among a display magnification for matching the vertical size of the LV image to the vertical size of the display region and a display magnification for matching the horizontal size of the LV image to the horizontal size of the display region. This normal magnification is also called a fit magnification.

In S302, the CPU 101 determines whether or not there is an instruction operation for enlarging or reducing the LV image. When there is an enlargement or reduction instruction operation, the processing proceeds to S303. Otherwise, the processing proceeds to S304. An instruction operation for enlargement or reduction is a pinch-out operation, a pinch-in operation, an operation of an enlargement button or a reduction button included in the operation unit 106, and the like.

In S303, the CPU 101 enlarges or reduces the LV image so that the LV image is displayed at the display magnification corresponding to the enlargement or reduction instruction operation. It is assumed that the lowest display magnification is the fit magnification and the display magnification lower than the fit magnification cannot be set. When a pinch-out operation is performed while displaying the LV image at the fit magnification, the LV image is displayed with an enlargement so as to increase the display magnification. When the LV image is displayed with an enlargement, the range of a part of the LV image instead of the entire LV image is displayed with an enlargement as the display range. The CPU 101 records the current display magnification and the position information indicating the current display range in the memory 102. The position information is, for example, coordinate information indicating the center position of the display range with respect to the entire LV image, coordinates at the upper left of the display range, coordinates of four vertexes at the upper left, upper right, lower right, and lower left of the display range, and the like. The display magnification is merely a magnification for display, not magnification of the optical zoom. Therefore, if the shutter is released, the entire range of the LV image is captured.

In S304, the CPU 101 determines whether or not there is a touch-down on the LV image displayed on the display 105.

When there is a touch-down, the processing proceeds to S305. Otherwise, the processing proceeds to S330. In the present embodiment, the operation unit 106 (the touch panel 106a) can receive a user operation of designating the position on the LV image and moving the designated position, and the touch-down on the LV image corresponds to the start of the user operation.

In S305, the CPU 101 superimposes and displays a specific display item at a position (touch position; designated position) at which a touch-down has occurred on the LV image. The display item in this embodiment is an AF frame.

In S306, the CPU 101 determines whether or not there is a touch-up. When there is a touch-up, the processing proceeds to S320. Otherwise the processing proceeds to S307. In the present embodiment, the touch-up performed subsequent to the touch-move corresponds to the end of the above-described user operation of designating the position on the LV image and moving the designated position.

In S307, the CPU 101 determines whether or not there is a touch-move. When there is a touch-move, the processing proceeds to S308. Otherwise the processing proceeds to S306.

In S308, the CPU 101 moves the display position of the display item to a position based on the touch position after the movement (for example, a touch position after the movement) by tracking the movement of the touch position.

In S309, the CPU 101 determines whether or not the touch position has moved within the edge region (edge portion) of the display region of the LV image (display range of the LV image) by the touch-move. As indicated by a dotted line frame in a screen 403 in FIG. 4, the edge region of the display region is a portion (region) of a predetermined range on the inner side from the outer frame of the display region (the solid line frame of the screen 403 in FIG. 4; edge) excluding the central region of the display region. For example, the edge region of the display region is a portion from the left side, the upper side, the right side, and the lower side of the display region to a predetermined distance. The same applies to the edge region of the display range. When the touch position moves within the edge region due to the touch-move, it is assumed that the user is trying to designate a position outside the current display range. Where the touch position moves within the edge region due to the touch-move (that is, when the touch position has moved to the end of the display range (display region)), the processing proceeds to S310. Otherwise, the display item is moved without a change of the display range, and the processing returns to S306.

Described hereinabove is an example in which the edge region (edge portion) is set within the display range of the LV image which is the display target, and such an approach is advantageous for displaying the LV image by taking the entire display surface of the display 105 as the display target. When the display region of the LV image is a part of the range rather than the entire display surface of the display 105, a region where a touch operation can be detected can also be secured outside the display region of the LV image. Therefore, the edge region may be a region including a predetermined range on the outer side from the outer frame of the display region of the LV image, excluding the central region of the display region of the LV image. In this way, it is possible to instruct to move the movement target (AF frame) to the end of the display region with the touch-move of the AF frame or the like. Further, the edge region may be a region within a predetermined range inside and outside the outer frame including the outer frame of the display region of the LV image. In any case, the edge region is a region for determining whether or not the movement target has been moved to the peripheral portion (the vicinity of the edge) of the display region of the display target (LV image) by the touch-move.

In S310, the CPU 101 determines whether or not the current display magnification corresponds to an enlarged state, that is, whether or not the current display magnification is higher than the normal magnification (the fit magnification in the present embodiment). Where the current display magnification is higher than the normal magnification, the processing proceeds to S311. Otherwise, the processing proceeds to S315.

In S311, the CPU 101 determines whether or not the magnification changed flag held in the memory 102 is 1. The initial value of the magnification changed flag at the time the image display processing is started is 0, indicating that the display magnification has not been changed due to the touch-move. Where the magnification changed flag is 1, the processing proceeds to S314. Otherwise (in the case of 0), the processing proceeds to S312.

In S312, the CPU 101 records the current display magnification (the magnification higher than the fit magnification; the enlargement ratio; the enlargement magnification) in the memory 102 as a display magnification M0 before the display magnification is changed by the touch-move. Further, the CPU 101 records the position information indicating the current display range in the memory 102 as the position information indicating the display range E0 before the change of the display range by the touch-move.

In S313, the CPU 101 sets 1 to the magnification changed flag.

In S314, the CPU 101 reduces the LV image so that the display magnification of the LV image decreases by a predetermined level. This reduction is such that the user can see how the LV image is gradually reduced, rather than a sharp reduction. For example, in the processing of one S314, the magnification obtained by multiplying the current display magnification by 0.9 is set as the display magnification after the change. As will be described later, while the touch position is within the edge region of the display region (display range), since the processing of S314 is repeated at predetermined time intervals, the LV image is gradually reduced so that the display magnification gradually decreases. As a result of not abruptly reducing the size, the user can easily grasp where the display range before the reduction will be positioned after the reduction. In response to the fact that the display magnification has reached the normal magnification, the CPU 101 may issue a predetermined notification, such as a notification of normal magnification, a notification that display magnification cannot be further decreased, and the like, on a screen display, by sound output, by lamp lighting, or the like.

In S315, the CPU 101 changes the position of the display range so that the direction corresponding to the current touch position is included in the new display range. Specifically, the CPU 101 changes the position (for example, the center position) of the display range of the LV image in the direction corresponding to the current touch position. Where the current touch position is within a predetermined range from the side (left side, upper side, right side, lower side) of the display region, the position of the display range is changed in the direction corresponding to the side (the leftward direction in the case of the left side, the upward direction in the case of the upper side, the rightward direction in the case of the right side, the downward direction in the case of the lower side). Similarly to S314, while the touch position is within the edge region of the display region (display range), since the processing of S315 is repeated at predetermined time intervals, the display position is gradually changed. At this time, when the display magnification is lowered in S314, the display range becomes relatively wide. Therefore, the CPU 101 changes the position of the display range so that the display range after the change encompasses the display range before the change. When the processing of S314 is not performed (when it is determined as No in S310), the change of the display range of S315 becomes a scroll which is not accompanied by a change of the display magnification, and at least a part of the display range before the change is not included in the display range after the change. When the display range has already abutted against the end of the LV image, the position of the display range is not changed in the direction corresponding to the current touch position.

A specific example of the effects of the processing of S314 and S315 will be described hereinbelow. As an example, a case will be considered where the touch position moves from left to right in a state where the LV image is displayed with magnification, and the touch position moves to an edge region within a predetermined range from the right side of the display region. In this case, while the touch position is present in the edge region within the predetermined range from the right side, the LV image gradually reduces as time elapses, and the range on the right side with respect to the display range before the touch-move becomes visible at a speed faster than the scroll which is not accompanied by a change of display magnification. Therefore, the user can easily and quickly find the desired portion on the LV image (a portion to which the display item is desired to be moved), and can easily and quickly move the display item to the desired portion. Also, since the range originally displayed is still visible, the user can move the display item while confirming the movement source of the display item and recognizing how much the display item has been moved.

In S316, the CPU 101 determines whether or not there is a touch-up. Where there is a touch-up, the processing proceeds to S320. Otherwise, the processing proceeds to S317.

In S317, the CPU 101 determines whether or not the touch position remains within the edge region of the display region (the upper, lower, right and left ranges are regarded as separate ranges). Where the touch position remains within the edge region, the processing proceeds to S310, and the processing of S310 to S317 is repeated at predetermined intervals. When the touch position moves from the inside of the edge region to the outside of the edge region, the processing exits the loop of S310 to S317 and proceeds to S306 in order to stop the change of display magnification and the change of the position of display range.

Where there is a touch-up, in S320, the CPU 101 determines whether or not the magnification changed flag held in the memory 102 is 1. Where the flag is 1, the processing proceeds to S321. Otherwise (in the case of 0), the processing proceeds to S330.

Figure 4:
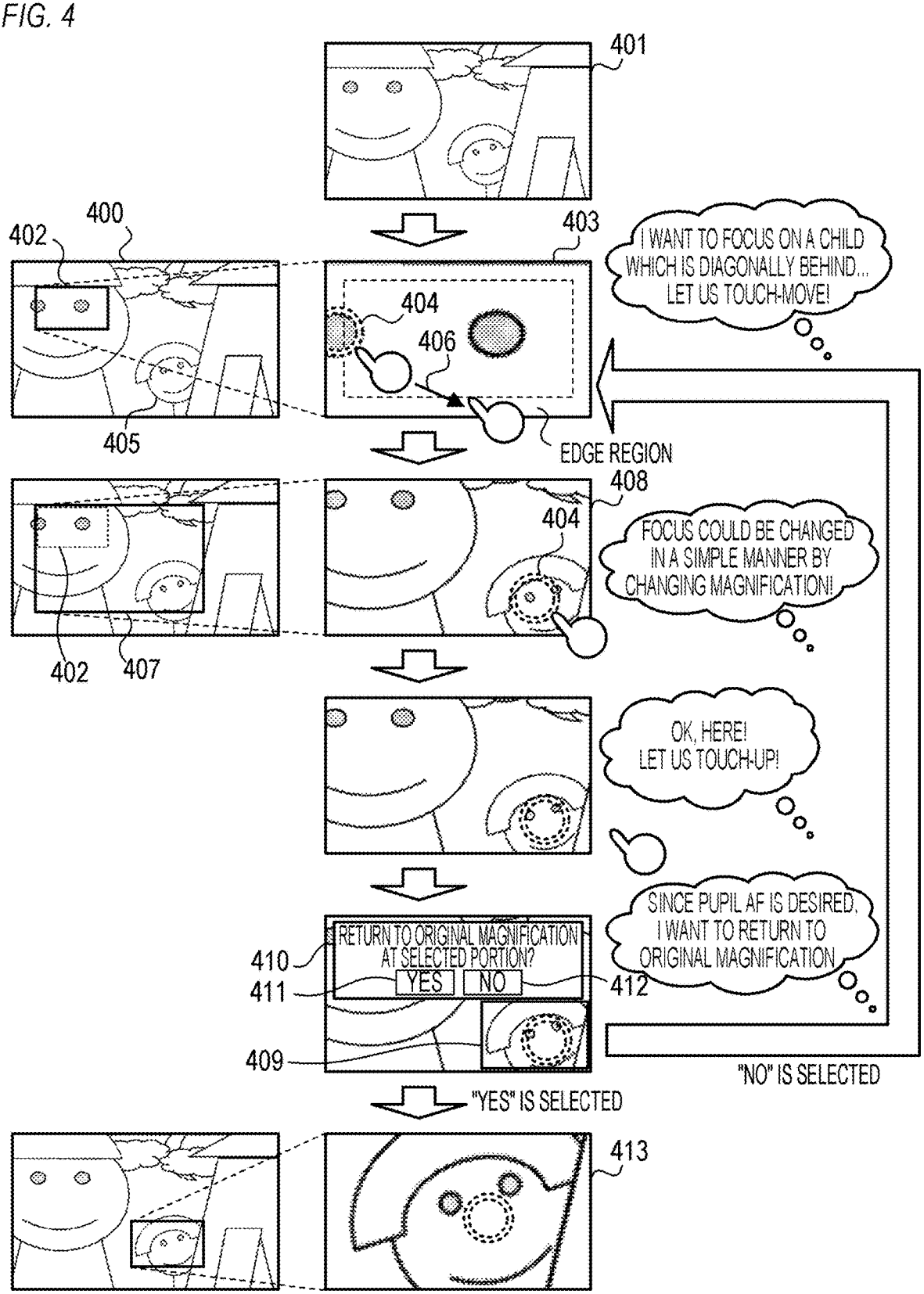
FIG. 4 is a screen example of the electronic apparatus according to the present embodiment.

In S321, the CPU 101 displays a notification item indicating the display range after returning the display magnification to the display magnification M0 (display magnification M0 before the change of display magnification by the touch-move) recorded in S312. Further, simultaneously with displaying the notification item, the CPU 101 queries the user as to whether or not to return the display magnification to the display magnification M0. In the present embodiment, as shown in FIG. 4, a notification item 409 showing the display range after returning the display magnification to the display magnification M0 at the position corresponding to the current position of the display item is displayed in superposition on the reduced LV image on the basis of the display magnification M0 and the current position of the display item. Further, the inquiring is the display of a first instruction item 411 for returning the display magnification to the display magnification M0 at a position corresponding to the current position of the display item and a second instruction item 412 for returning the display range to the display range E0 before the touch operation. The notification item may be an indicator indicating the display range, and the display form thereof does not have to be a frame. The display range indicated by the notification item may be the display range E0 before the touch operation. The second instruction item 412 may be an instruction item for not returning the display magnification to the display magnification M0.

In S322, in response to the inquiring in S321, the CPU 101 determines whether or not there is a response (user operation of selecting the first instruction item 411) to return the display magnification to the display magnification M0 at a position corresponding to the current position of the display item. Where there is such a response, the processing proceeds to S323. Otherwise, the processing proceeds to S325.

In S323, based on the display magnification M0 and the current position of the display item, the CPU 101 changes the position of the display range to a position corresponding to the current position of the display item and returns the display magnification to the display magnification M0 before the touch operation. As a result, the reduction processing of S314 performed by the touch operation before the touch-up is canceled, and a range (for example, a range centered on the current position of the display item) based on the position of the display item after the touch operation is displayed at the magnification M0.

In S324, the CPU 101 resets the magnification changed flag to 0, and returns to S302 to wait for the next operation.

In S325, the CPU 101 determines whether or not the timer that starts counting from the timing of touch-up has timed out. When the timeout occurs (that is, when there is no operation until a predetermined time (about 1 sec to 5 sec) elapses from the touch-up), the processing proceeds to S323. Otherwise, the processing proceeds to S326. In this manner, even if there is no explicit instruction from the user, the display magnification is returned to the display magnification M0 before the touch operation when the predetermined time elapses. As a result, it is possible to omit the instruction operation of returning the display magnification to the display magnification M0. Since there is such a timeout processing, it is possible to avoid displaying the instruction item in S321. The reason for providing such a timer is that the user may perform the touch operation again to see the LV image reduced in S314 after the touch up and designate the position where the display item is to be displayed in superposition. Where the display magnification returns to the original display magnification M0 at the time when the user who has recognized the position desired to be designated on the LV image reduced in S314 performs a touch-up once to touch the position desired to be designated, the user may lose sight of the position desired to be designated. As a result of not changing the display range (display magnification) until the predetermined time elapses in S325, the user who is going to perform successively the position designation operation is prevented from losing sight of the position that was desired to be designated.

In S326, the CPU 101 determines whether or not there is a response (operation to select the second instruction item 412) for returning the display range to the display range E0 before the touch operation to the inquiring in S321. Where there is a response within a predetermined time after the touch-up, the processing proceeds to S327. Otherwise, the processing proceeds to S328.

In S327, the CPU 101 returns the display range to the display range E0 before the touch operation on the basis of display magnification M0 (display magnification M0 before the change of display magnification by the touch-move) and the display range E0 (display range E0 before the change of display range by the touch-move) recorded in S312. As a result, it is possible to cancel the movement operation (display range change) of the display item by the last touch operation.

In S328, the CPU 101 determines whether a touch-down has occurred in the LV image displayed in reduced size in S314. Where a touch-down has occurred, the processing proceeds to S305, and a display item (AF frame) is displayed at (moved to) the touched-down position with respect to the LV image displayed in reduced size in S314. Where there is no touch-down, the processing returns to S322.

Where the processing of S321, S322, and S324 to S328 is eliminated and it is determined that the touch-up has occurred in S306 or S316, the processing may directly proceed to S323. In this way, while the screen is touched, the LV image can be checked at the display magnification reduced in S314, the display returned to the original display magnification M0 can be realized according to the position of the moved display item immediately after the touch-up, and responsiveness is improved. Likewise, where the processing of S321, S322, and S324 to S328 is eliminated and it is determined that the touch-up has occurred in S306 or S316, the processing may directly proceed to S327. In addition, in response to the timeout of S325, the processing may proceed to S327 instead of S323.

In S330, the CPU 101 determines whether or not another operation is performed. Where another operation is performed, the processing proceeds to S331. Otherwise, the processing proceeds to S332.

In S331, the CPU 101 performs processing according to the other operation. For example, when an image capturing instruction operation is performed, the AF processing is performed based on the position of the AF frame set by the above-described processing, image capturing is performed with the camera unit 114, and the image file of the captured image is recorded.

In S332, the CPU 101 determines whether or not there has been an end event of image display processing, such as turning off the power or transition to another mode. Where there is no end event, the processing returns to S302 and the processing is repeated. When there is an end event, the image display processing of FIG. 3 is ended.

FIG. 4 shows a specific example of the operation of the image display processing of FIG. 3. On the screen 401, an LV image 400 is displayed at normal magnification (fit magnification) (S301). When there is an instruction operation for displaying the LV image 400 with enlargement (S302), the display screen is updated from the screen 401 to a screen 403 so that the range 402 of the LV image 400 is displayed with enlargement as the display range in response to the aforementioned instruction operation (S303). When the user performs a touch-down on the screen 403 (S304), a display item (AF frame) 404 is displayed at the position of the touch-down (S305).

Here, it is assumed that the user has performed a touch-move of moving the touch position in the direction of an arrow 406 (downward and rightward direction) so that the AF frame 404 enters the edge region of the range 402 in order to focus on a person 405 appearing at the lower right side of the range 402 (S307 and S308). In response to this touch-move, the center position of the display range of the LV image 400 is changed in the downward and rightward direction and the display magnification of the LV image 400 is lowered (S314 and S315). As a result, the display range is updated from the range 402 to a range 407, and the display screen is updated from the screen 403 to a screen 408. As a result, the user can easily move the AF frame 404 to the position of the person 405, so that the user can easily focus on the person 405.

Next, it is assumed that the user has performed a touch-up in order to fix the position of the AF frame 404 at the position of the person 405 (S306 or S316). In response to this touch-up, a notification item 409 indicating the display range after returning the display magnification to the original display magnification (the display magnification of the screen 403) at the position corresponding to the current position of the AF frame 404 is displayed (S321). Furthermore, in response to this touch-up, a guidance 410 for inquiring the user as to whether or not to return the display magnification to the original display magnification is also displayed. The guidance 410 includes the first instruction item 411 for returning the display magnification to the original display magnification at a position corresponding to the current position of the AF frame 404 and a second instruction item 412 for returning the display range to the original display range (range 402).

When the user selects the first instruction item 411, the display screen is updated from the screen 408 to the screen 413 for displaying the display range indicated by the notification item 409. Meanwhile, when the user selects the second instruction item 412, the display screen is returned from the screen 408 to the screen 403.

When the AF method is set to one-point AF, the display magnification is returned to the original display magnification after the movement of the AF frame (after the touch-up). Otherwise, (when the AF method is set to face AF or zone AF), the display magnification may not be returned to the original display magnification. Further, when the AF frame after the movement is included in a face region detected by face detection processing for the face AF, the AF frame is set to the face region and the display magnification may be changed to the display magnification based on the face region (for example, the display magnification at which the entire face region is displayed).

The display target is not limited to the LV image, and may be a reproduced image, a wide-field image displayable in a VR (Virtual Reality) view, a map, a screen of text editing software, a screen of spreadsheet software, a screen of a WEB browser, a screen of layout editing software, or the like. The display item is not limited to the AF frame, and may be a stamp, a superimposed character string, a cursor, or the like. It is also possible not to display a display item. For example, the present invention can be applied to scenes where a display item is not displayed and a map is moved so that the designated position becomes the center of the display range. The normal magnification may be a predetermined display magnification (standard magnification; reference scale) which is higher or lower than the display magnification at which the entire display object fits.

The user operation of designating the position on the display target and moving the designated position is not limited to the touch operation, and may be an operation using, for example, a mouse. In the operation using a mouse, a drag corresponds to the user operation of designating the position on the display target and moving the designated position. Specifically, the pressing of the mouse button corresponds to the touch-down in S304 and S328 in FIG. 3, the operation of moving the mouse while pressing the mouse button corresponds to the touch-move in S307, and the release of the depression of the mouse button corresponds to the touch-up in S306 and S316.

Figure 5:
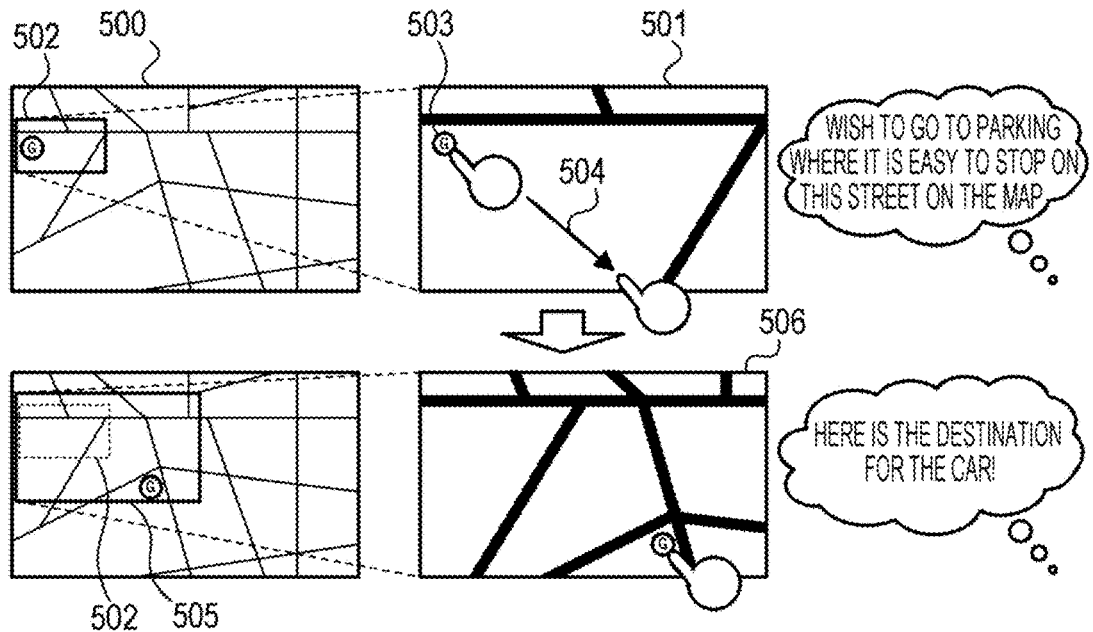
FIG. 5 is a screen example of another electronic apparatus according to the present embodiment.
Figure 5:
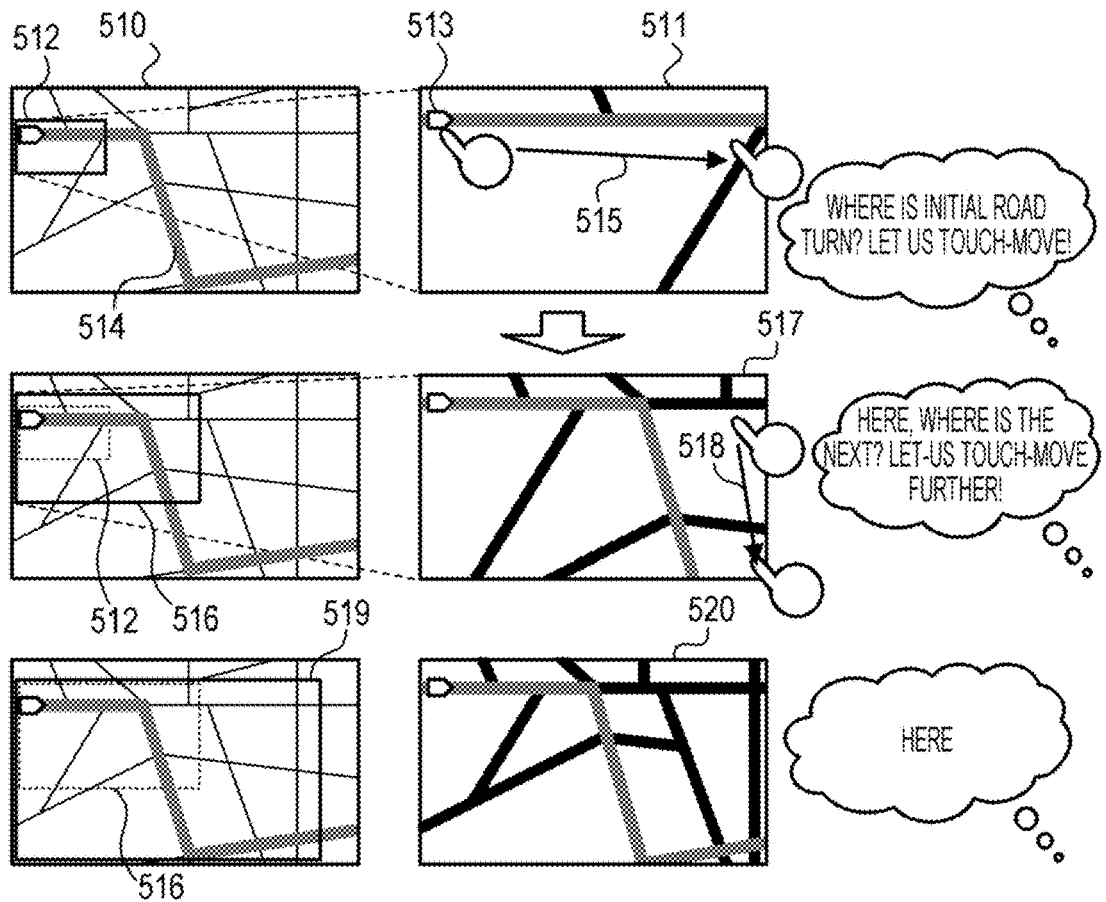

FIG. 5 shows a specific example of an image display processing operation performed when the display target is a map. In the case where the display target is a map, the present invention is applicable for example, to a scene for searching for and setting a destination on the map, a scene for checking a portion next to the displayed portion in the route from the current position to the destination on the map, and the like.

An example of a scene for searching for and setting a destination is explained hereinbelow. On a screen 501, a range 502 of a map 500 as a display target replacing the LV image of the above-described processing is displayed with enlargement as a display range, and a destination icon (an icon indicating the destination) 503 is also displayed as a display item replacing the AF frame of the above-described processing. Here, it is assumed that in order to change the destination, the user performs a touch-move to move the destination icon 503 in the direction of an arrow 504 so that the destination icon 503 enters the edge region of the display range of the map 500. In response to this touch-move, the center position of the display range of the map 500 is changed and the display magnification (scale) of the map 500 is lowered, whereby the display range is updated from the range 502 to the range 505, and the display screen is updated from the screen 501 to the screen 506. As a result, the user can easily move the destination icon 503 to the desired position and set the desired point as the destination.

An example of a scene for checking a portion next to the displayed portion in the route from the current position to the destination on the map is explained hereinbelow. On a screen 511, a range 512 of a map 510 as a display target replacing the LV image of the above-described processing is displayed with enlargement, and a current portion icon (icon indicating the current portion) 513 and a route 514 to the destination are also displayed. In this example, the position on the map is designated by the touch-move, and control is performed so that an ideographic range is changed on the basis of this position, but there is no display item to be moved in response to the touch-move.

Here, it is assumed that in order to confirm the next portion of the route 514 yet to be displayed (for example, the next turn), the user performs a touch-move to move the touch position in the direction of an arrow 515 so that the touch position enters the edge region of the display range of the map 510. In response to this touch-move, the center position of the display range of the map 510 is changed and the display magnification (scale) of the map 510 is lowered, whereby the display range is updated from the range 512 to a range 516, and the display screen is updated from a screen 511 to a screen 517.

Further, it is also assumed that in order to confirm the next portion of the route 514 yet to be displayed, the user continues the touch-move so that the touch position moves in the direction of an arrow 518 within the edge region of the display range of the map 510. In response to this touch-move, the center position of the display range of the map 510 is further changed and the display magnification (scale) of the map 510 is further lowered, whereby the display range is updated from the range 516 to a range 519, and the display screen is updated from the screen 517 to a screen 520.

By updating the display screen from the screen 511 to the screen 517, updating the display screen from the screen 517 to the screen 517, etc., the user can easily confirm the next portion of the route 514 yet to be displayed.

Although the present invention has been described in detail with reference to the preferred embodiments thereof, the present invention is not limited to these specific embodiments, and the present invention is also inclusive of various embodiments that do not depart from the gist thereof. Furthermore, each of the above-described embodiments merely shows one embodiment of the present invention, and these embodiments can be combined as appropriate.

The above-described various kinds of control operations described as being performed by the CPU 101 may be performed by one piece of hardware, or the control of the entire apparatus may be performed by a plurality of pieces of hardware (for example, a plurality of processors and circuits) sharing the processing.

Further, in the above-described embodiment, an example is explained in which the present invention is applied to a smartphone, but the present invention is not limited to this example and can be applied to any electronic apparatus that can receive a user operation of designating a position on a display target and moving the designated position. For example, the present invention can be applied to personal computers, PDAs, mobile phone terminals, portable image viewers, digital cameras, printer devices, digital photo frames, music players, game machines, electronic book readers, video players, display devices (including projection devices), tablet terminals, smartphones, AI speakers, household electronic devices, vehicle onboard devices, and the like.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-084876, filed on Apr. 26, 2018, which is hereby incorporated by reference herein in its entirety.

What is claimed is:

1. An electronic apparatus comprising a memory and at least one processor and/or at least one circuit to perform the operations of the following units:
    a control unit configured to perform control to display an entire or a partial region of a display target as a display range on a display region having a central region and an edge region, wherein the edge region is defined along a periphery of the display region, between an outer boundary of the display region and an inner boundary within the display region, and wherein the edge region excludes the central region; and
    a receiving unit configured to receive a touch movement operation on the display region from a user, a touch movement operation being an operation of moving a designated position on the display target displayed on the display region, wherein
    in a case where a partial region of the display target is displayed as the display range at a second magnification that is higher than a first magnification at which the entirety of the display target is displayed as the display range,
        the control unit performs, in response to the touch movement operation on the display region moving the designated position within the central region, and not to a position within the edge region, controlling to move the designated position without changing the display range, and
        the control unit performs, in response to the touch movement operation on the display region moving the designated position from a position within the central region to a position within the edge region, controlling to move the designated position and to enlarge the display range by lowering a display magnification of the display target to a magnification higher than the first magnification and lower than the second magnification,
    wherein the control unit performs control to return the display magnification to the second magnification in response to an end of the touch movement operation on the display region.

2. The electronic apparatus according to claim 1, wherein the control unit performs control to return the display magnification to the second magnification in response to an elapse of a predetermined time without any operation after the touch movement operation on the display region ends.

3. The electronic apparatus according to claim 1, wherein the control unit performs control to return the display magnification to the second magnification in response to an instruction operation for returning to the second magnification after the touch movement operation on the display region ends.

4. The electronic apparatus according to claim 1, wherein the control unit performs control to change the position of the display range to a position corresponding to the designated position in a case of returning the display magnification to the second magnification.

5. The electronic apparatus according to claim 2, wherein the control unit performs control to change the position of the display range to an original position before the touch movement operation on the display region is performed in a case of returning the display magnification to the second magnification.

6. The electronic apparatus according to claim 1, wherein the control unit performs control to return the display magnification to the second magnification and change the position of the display range to an original position before the touch movement operation on the display region is performed, in a case where an instruction operation is performed within a predetermined time after the touch movement operation on the display region ends, the instruction operation being an operation for returning the position of the display range to the original position before the touch movement operation on the display region is performed; and performs control to return the display magnification to the second magnification and change the position of the display range to a position corresponding to the designated position, in a case where a predetermined time elapses without any operation after the touch movement operation on the display region ends.

7. The electronic apparatus according to claim 1, wherein the control unit performs control to display an indicator, which indicates a display range after returning the display magnification to the second magnification, before returning to the second magnification after the touch movement operation on the display region ends.

8. The electronic apparatus according to claim 1, wherein the control unit performs control to inquire of a user whether or not to return the display magnification to the second magnification in response to the touch movement operation on the display region ending.

9. The electronic apparatus according to claim 8, wherein the inquiring as to whether or not to return the display magnification to the second magnification is an inquiring as to whether or not to change the position of the display range to the position corresponding to the designated position and to return the display magnification to the second magnification.

10. The electronic apparatus according to claim 1, wherein the control unit performs control to gradually change the position of the display range and gradually decrease the display magnification while the designated position moved into the edge region is present in the edge region.

11. The electronic apparatus according to claim 1, wherein the control unit performs control so that the display range after the position of the display range is changed in a direction corresponding to the designated position and the display magnification of the display target is lowered from the second magnification includes the original display range.

12. The electronic apparatus according to claim 1, wherein the edge region is predetermined.

13. The electronic apparatus according to claim 1, wherein the edge region extends completely around the periphery of the display region.

14. The electronic apparatus according to claim 1, wherein the memory and at least one processor and/or at least one circuit further performs the operations of a display control unit configured to perform control so as to display a specific display item in superposition on the display target and to change the display position of the specific display item as the designated position is moved by the touch movement operation on the display region.

15. The electronic apparatus according to claim 1, wherein the display target is an image captured by an image sensor or a reproduced image.

16. The electronic apparatus according to claim 1, wherein the display target is a map.

17. A control method for an electronic apparatus, comprising:

a control step of performing control to display an entire or a partial region of a display target as a display range on a display region having a central region and an edge region, wherein the edge region is defined along a periphery of the display region, between an outer boundary of the display region and an inner boundary within the display region, and wherein the edge region excludes the central region; and a receiving step of receiving a touch movement operation on the display region from a user, a touch movement operation being an operation of moving a designated position on the display target displayed on the display region, wherein in a case where a partial region of the display target is displayed as the display range at a second magnification that is higher than a first magnification at which the entire of the display target is displayed as the display range, in a control step, in response to the touch movement operation on the display region moving the designated position within the central region, and not to a position within the edge region, controlling is performed to move the designated position without changing the display range, and in response to the touch movement operation on the display region moving the designated position from a position within the central region to a position within the edge region, controlling is performed to move the designated position and to enlarge the display range by lowering a display magnification of the display target to a magnification higher than the first magnification and lower than the second magnification, wherein the control unit performs control to return the display magnification to the second magnification in response to an end of the touch movement operation on the display region.

18. A non-transitory computer readable medium that stores a program, wherein the program causes a computer to execute:

a control step of performing control to display an entire or a partial region of a display target as a display range on a display region having a central region and an edge region, wherein the edge region is defined along a periphery of the display region, between an outer boundary of the display region and an inner boundary within the display region, and wherein the edge region excludes the central region; and a receiving step of receiving a touch movement operation on the display region from a user, a touch movement operation being an operation of moving a designated position on the display target displayed on the display region, wherein in a case where a partial region of the display target is displayed as the display range at a second magnification that is higher than a first magnification at which the entire of the display target is displayed as the display range, in a control step, in response to the touch movement operation on the display region moving the designated position within the central region, and not to a position within the edge region, controlling is performed to move the designated position without changing the display range, and in response to the touch movement operation on the display region moving the designated position from a position within the central region to a position within the edge region, controlling is performed to move the designated position and to enlarge the display range by lowering a display magnification of the display target to a magnification higher than the first magnification and lower than the second magnification, wherein the control unit performs control to return the display magnification to the second magnification in response to an end of the touch movement operation on the display region.

\* \* \* \* \*